United States Patent
Kawakami et al.

(10) Patent No.: US 12,240,731 B2
(45) Date of Patent: Mar. 4, 2025

(54) SHEET SEPARATION DEVICE, LAMINATOR, IMAGE FORMING APPARATUS, AND IMAGE FORMING SYSTEM

(71) Applicants: Koju Kawakami, Tokyo (JP); Akira Kunieda, Tokyo (JP); Yohsuke Haraguchi, Kanagawa (JP); Hirofumi Horita, Kanagawa (JP); Satoshi Kuno, Tokyo (JP); Yasunobu Kidoura, Kanagawa (JP); Ryohsuke Akaishi, Kanagawa (JP)

(72) Inventors: Koju Kawakami, Tokyo (JP); Akira Kunieda, Tokyo (JP); Yohsuke Haraguchi, Kanagawa (JP); Hirofumi Horita, Kanagawa (JP); Satoshi Kuno, Tokyo (JP); Yasunobu Kidoura, Kanagawa (JP); Ryohsuke Akaishi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 107 days.

(21) Appl. No.: 18/170,350

(22) Filed: Feb. 16, 2023

(65) Prior Publication Data
US 2023/0264909 A1 Aug. 24, 2023

(30) Foreign Application Priority Data

Feb. 22, 2022 (JP) .................................. 2022-025932
Dec. 13, 2022 (JP) .................................. 2022-198812

(51) Int. Cl.
*B32B 37/00* (2006.01)
*B32B 37/18* (2006.01)
(Continued)

(52) U.S. Cl.
CPC ......... *B65H 9/004* (2013.01); *B32B 37/0053* (2013.01); *B32B 37/185* (2013.01);
(Continued)

(58) Field of Classification Search
CPC .......... B41L 43/14; B41F 13/68; B32B 27/10; B32B 27/36; B32B 38/145;
(Continued)

(56) References Cited

U.S. PATENT DOCUMENTS 10,857,776 B2 * 12/2020 Morinaga ........... B32B 37/0046
11,269,280 B2 * 3/2022 Takahashi ............. B32B 37/142
(Continued)

FOREIGN PATENT DOCUMENTS

JP 2013-237506 11/2013

*Primary Examiner* — Leslie A Nicholson, III
(74) *Attorney, Agent, or Firm* — Harness, Dickey & Pierce, P.L.C.

(57) ABSTRACT

A sheet separation device that conveys a two-ply sheet in a state where the one side joined is located on an upstream side or a downstream side of the two-ply sheet in a conveyance direction, separates the two-ply sheet into the two sheets, and inserts an inner sheet from a non-joined side opposite the joined side in the sheet conveyance direction so that the inner sheet is sandwiched between the two sheets overlaid with each other includes a conveying roller pair including a pair of rollers and circuitry. The conveying roller pair conveys the two-ply sheet and holds a joined portion of in the two-ply sheet at which the two sheets are joined, at a nip portion of the conveying roller pair when the inner sheet is inserted into the two-ply sheet. The circuitry contacts the inner sheet against the joined portion of the two-ply sheet to perform skew correction.

11 Claims, 7 Drawing Sheets

(51) Int. Cl.
*B32B 38/00* (2006.01)
*B32B 38/18* (2006.01)
*B65H 9/00* (2006.01)
B32B 27/10 (2006.01)
B32B 27/36 (2006.01)

(52) U.S. Cl.
CPC ........ *B32B 38/145* (2013.01); *B32B 38/1808* (2013.01); *B32B 27/10* (2013.01); *B32B 27/36* (2013.01); *B32B 2317/12* (2013.01); *B32B 2367/00* (2013.01); *B65H 2404/14* (2013.01); *B65H 2801/06* (2013.01); *B65H 2801/27* (2013.01)

(58) Field of Classification Search
CPC ............ B32B 38/1808; B32B 37/0053; B32B 37/185; B65H 9/004
USPC ...................................................... 270/52.19
See application file for complete search history.

(56) References Cited

U.S. PATENT DOCUMENTS

| | | | |
|---|---|---|---|
| 11,845,254 B2* | 12/2023 | Furuhashi | B32B 43/006 |
| 11,899,389 B2* | 2/2024 | Morinaga | B32B 37/142 |
| 2022/0291620 A1 | 9/2022 | Fujita et al. | |

* cited by examiner

SHEET SEPARATION DEVICE, LAMINATOR, IMAGE FORMING APPARATUS, AND IMAGE FORMING SYSTEM

CROSS-REFERENCE TO RELATED APPLICATIONS

This patent application is based on and claims priority pursuant to 35 U.S.C. § 119(a) to Japanese Patent Application Nos. 2022-025932, filed on Feb. 22, 2022, and 2022-198812, filed on Dec. 13, 2022, in the Japan Patent Office, the entire disclosure of which is hereby incorporated by reference herein.

BACKGROUND

Technical Field

Embodiments of the present disclosure relate to a sheet separation device, a laminator, an image forming apparatus, and an image forming system.

Related Art

A technology so-called lamination processing is already known that a desired inner sheet is sandwiched between two lamination films whose one sides are joined to each other, and heat and pressure are applied to bond the two lamination films, so that the inner sheet inside the two lamination films is sandwiched by the two sheets of the two lamination films. In such a laminator, a configuration is known that, when the lamination films or the inner sheet is conveyed, multiple times of skew correction are performed with different registration roller pairs for the purpose of correcting a skew of a fed sheet effectively and correcting the unevenness of the sheet position.

SUMMARY

In an embodiment of the present disclosure, there is provided a sheet separation device that conveys a two-ply sheet, in which two sheets are overlaid with each other and joined at one side of four sides of the two-ply sheet, in a state where the one side joined is located on an upstream side or a downstream side of the two-ply sheet in a sheet conveyance direction, separates the two-ply sheet into the two sheets at an end opposite the one side joined, and inserts an inner sheet from a non-joined side opposite the joined side in the sheet conveyance direction so that the inner sheet is sandwiched between the two sheets overlaid with each other. The sheet separation device includes a conveying roller pair including a pair of rollers and circuitry. The conveying roller pair conveys the two-ply sheet and holds a joined portion of in the two-ply sheet at which the two sheets are joined, at a nip portion of the conveying roller pair when the inner sheet is inserted into the two-ply sheet. The circuitry contacts the inner sheet against the joined portion of the two-ply sheet to perform skew correction.

In another embodiment of the present disclosure, there is provided a laminator that includes the sheet separation device.

In still another embodiment of the present disclosure, there is provided an image forming apparatus that includes the sheet separation device or the laminator.

In still yet another embodiment of the present disclosure, there is provided an image forming system that includes the sheet separation device or the laminator, and the image forming apparatus.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Figure 1:
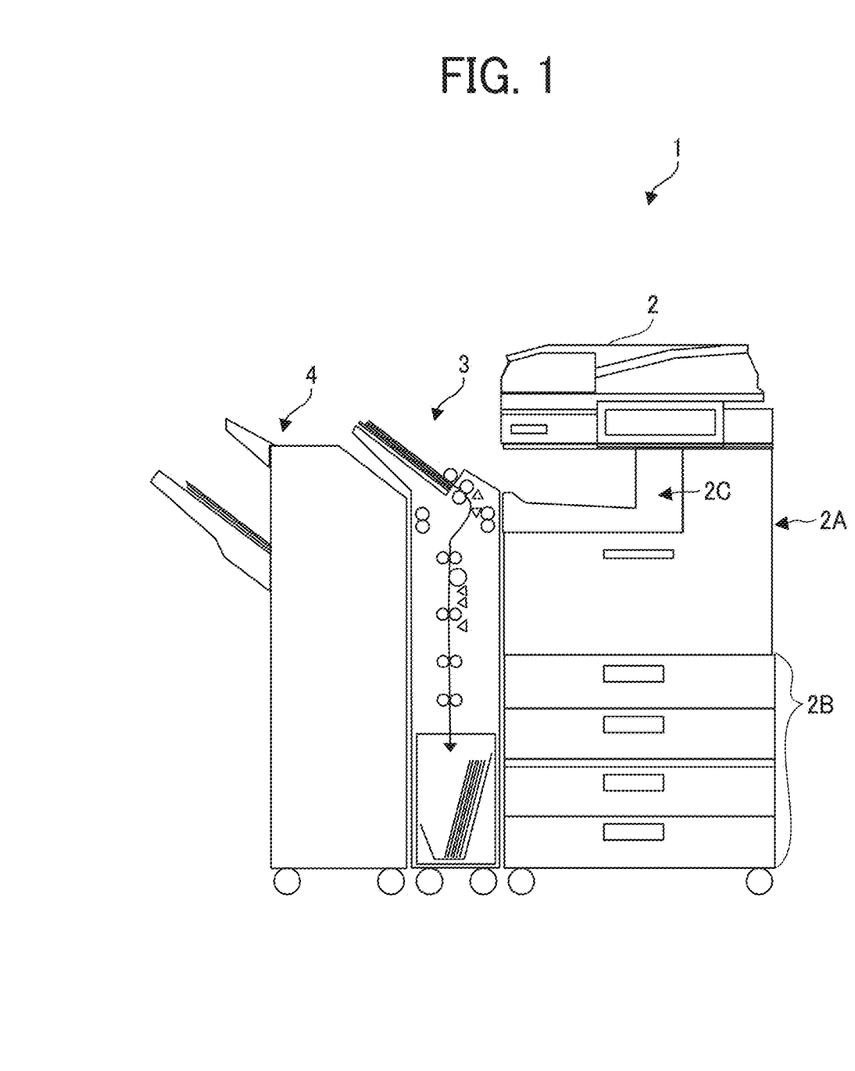
FIG. 1 is a schematic view of an image forming system including a laminator, according to an embodiment of the present disclosure.

FIG. 1 illustrates an image forming system to which an embodiment of the present disclosure can be applied. An image forming system 1 includes an image forming apparatus 2, a laminator 3, and a post-processing apparatus 4. The image forming apparatus 2 has, for example, a copy function, a print function, and a facsimile function. The image forming apparatus 2 alone functions as an image forming apparatus. A configuration including the image forming apparatus 2 and the laminator 3, or a configuration including the image forming apparatus 2 and the post-processing apparatus 4 functions as the image forming system 1.

The image forming apparatus 2 includes an image forming device 2A and a sheet feeder 2B. The image forming device 2A forms an image on a transfer sheet as a recording medium. The sheet feeder 2B stores transfer sheets on which images are to be formed and feeds the transfer sheets to the image forming device 2A. The transfer sheets stored in the sheet feeder 2B and used for image formation also include inner sheets used when laminate processing is performed in the laminator 3 and sealed between lamination sheets. The transfer sheet on which an image has been formed in the image forming apparatus 2 is ejected onto a relay device 2C that also serves as an output tray. The transfer sheet ejected onto the relay device 2C can be fed to the laminator 3 in that state. Accordingly, since image formation can be performed on the inner sheet by the image forming apparatus 2, the image forming system 1 including the image forming apparatus 2 and the laminator 3 can automatically perform a series of processes including feeding of the lamination sheet, separation, inner sheet preparation, inner sheet insertion, and laminating.

Figure 2:
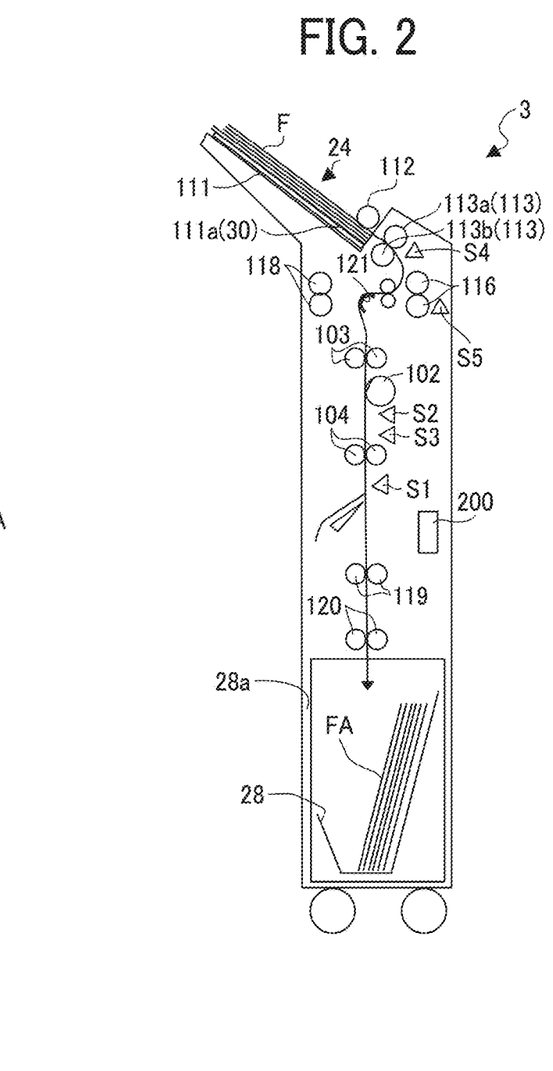
FIG. 2 is a schematic view of the laminator of FIG. 1.

The laminator 3 illustrated in FIGS. 1 and 2 is an apparatus that performs the laminate processing in which an inner sheet (e.g., paper or photograph) is inserted into a lamination film serving as a two-ply sheet in which two stacked sheets are joined at only one side, applies heat and pressure, and joins the lamination sheet holding the inner sheet. In the following description, the expression of "joining the lamination sheet and the inner sheet" is used. Examples of a lamination film F used as a sheet include a sheet in which one side is permeable such as a polyester sheet and the other side is permeable or impermeable, and a lamination film. Examples of the inner sheet include plain paper, thick paper, postcards, envelopes, thin paper, coated paper, tracing paper, and overhead projector (OHP) transparencies.

The laminator 3 includes a sheet feed tray 111 on which the lamination films F are stacked, a sheet feed roller 112 that feeds the lamination films F on the sheet feed tray 111, and a separation roller pair 113 that separates the lamination sheets S fed by the sheet feed roller 112 one by one. The sheet feed roller 112 is driven by a sheet feed roller motor 112a (see FIG. 3). The sheet feed tray 111 is provided with a plurality of sheet size detection sensors 111b (see FIG. 3) that detect the size of the stacked lamination films F. The sheet feed tray 111 includes a sheet tray 111a as a liftable sheet stacker on which the lamination films F are stacked. The sheet tray 111a is lifted and lowered by a lifter 30 described below so that the uppermost lamination film F is pressed against the sheet feed roller 112 with a specified pressing force. The separation roller pair 113 includes a feed roller 113a that is driven to rotate in conjunction with the sheet feed roller 112 and a separate roller 113b that is stoppable or rotatable in a direction opposite to a sheet feed direction (see FIG. 4). The feed roller 113a and the separate roller 113b have high frictional resistance members on their surfaces. When two or more lamination films F are fed, only one sheet is fed due to the difference between frictional resistance between the sheets and frictional resistance between the sheet and the rollers. Among the above-described configurations, the sheet feed tray 111, the sheet feed roller 112, the separation roller pair 113, and the lifter 30 disposed below the sheet feed tray 111 constitute a sheet feeder 24 serving as a sheet feeder according to an embodiment of the present disclosure.

Figure 5:
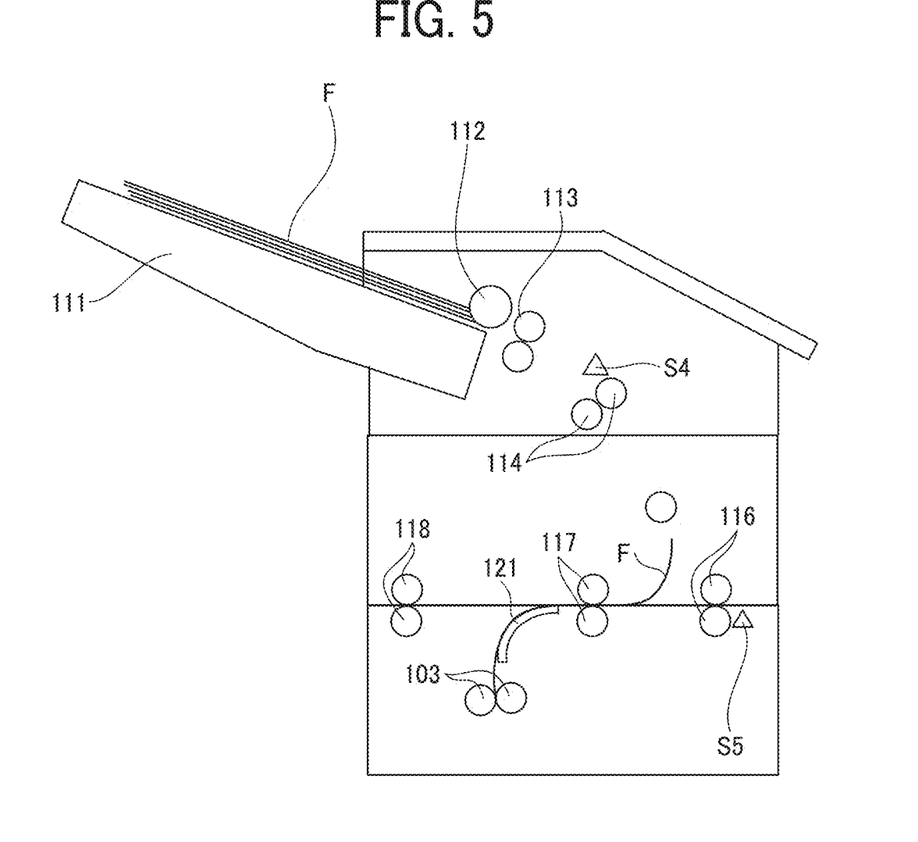
FIG. 5 is a diagram illustrating a conveyance operation in a turn guide plate and a second conveying roller pair.

A sheet position detection sensor S4 that detects conveyance of the lamination film F is disposed downstream from the separation roller pair 113 in the sheet conveyance direction. As illustrated in FIG. 5, an entrance roller pair 116 and a sheet position detection sensor S5 are disposed below the sheet position detection sensor S4. The entrance roller pair 116 receives the transfer sheet sent from the image forming apparatus 2. The sheet position detection sensor S5 detects the conveyed transfer sheet. A conveying roller pair 117 and an ejection roller pair 118 are disposed on the left side of the entrance roller pair 116. The ejection roller pair 118 sends out the transfer sheet sent from the image forming apparatus 2 to the post-processing apparatus 4 in a case where the transfer sheet sent from the image forming apparatus 2 is not subjected to the laminate processing in the laminator 3. A turn guide plate 121 that is a guide plate having a large curvature is disposed between the conveying roller pair 117 and the ejection roller pair 118. The turn guide plate 121 guides the lamination film F to a separation section to be described below when the lamination film F is subjected to the separation processing.

Figure 6:
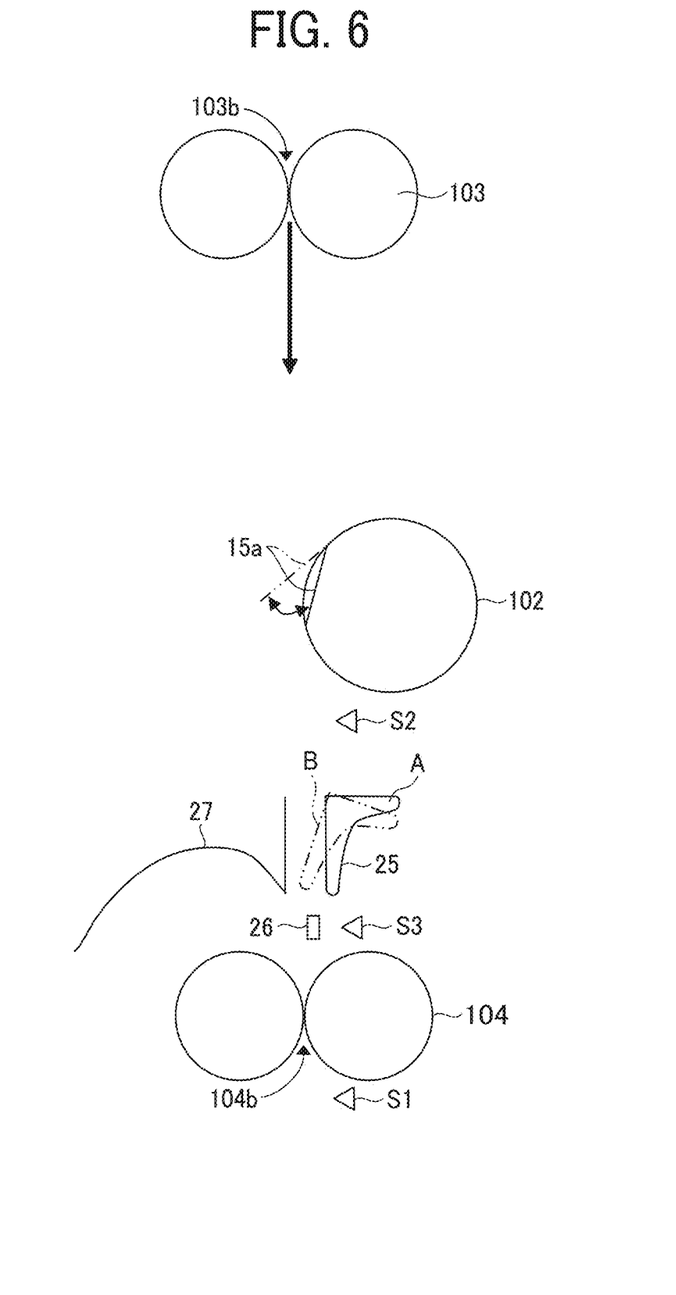
FIG. 6 is a diagram illustrating a positional relationship between a first conveying roller pair and a third conveying roller pair.

A second conveying roller pair 114, a third conveying roller pair 103, a winding roller 102, a first conveying roller pair 104, a heating roller pair 119, an ejection roller pair 120, sheet position detection sensors S1, S2, S4, and S5, and a sheet condition detection sensor S3 are disposed downstream from the separation roller pair 113 in the sheet conveyance direction. As illustrated in FIGS. 5 and 6, the sheet position detection sensors S1 and S2 and the sheet condition detection sensor S3 are disposed downstream from the winding roller 102 in the sheet conveyance direction. The sheet position detection sensors S1 and S2 detect the positions of the lamination film F and the inner sheet P serving as a transfer sheet. The sheet condition detection sensor S3 detects the condition of the lamination film F.

In FIGS. 1 and 2, each of the first conveying roller pair 104, the second conveying roller pair 114, and the third conveying roller pair 103 includes a drive roller and a driven roller that are pressed against each other to form a nip portion. A first conveying roller pair motor 104a (see FIG. 3) drives a drive roller of the first conveying roller pair 104 to rotate. A second conveying roller pair motor 114a (see FIG. 3) drives a drive roller of the second conveying roller pair 114 to rotate. A third conveying roller pair motor 103a (see FIG. 3) drives a drive roller of the third conveying roller pair 103 to rotate. Thus, the lamination film F and the inner sheet P are nipped and conveyed. The second conveying roller pair 114 is rotatable only in a conveyance direction in which the sheet is conveyed downward in FIG. 2. The first conveying roller pair 104 is rotatable in both the conveyance direction and a reverse conveyance direction opposite to the conveyance direction.

As illustrated in FIG. 6, the winding roller 102, the sheet position detection sensor S2, the sheet condition detection sensor S3, a switching claw 25, a separation claw 26, and a guide plate 27 are disposed between the third conveying roller pair 103 and the first conveying roller pair 104. The winding roller 102 is a roller that is driven to rotate by a winding roller motor 102a (see FIG. 3), and is rotatable in both the conveyance direction and the reverse conveyance direction similarly to the first conveying roller pair 104. The winding roller 102 has a gripper 15a that holds the lamination film F on its outer circumferential surface. The gripper 15a is displaced by a gripper motor 15a1 (see FIG. 3) and selectively occupies a closed position indicated by a solid line and an open position indicated by a long dashed double-dotted line in FIG. 6. An end of the lamination film F can be gripped at the closed position, and the gripped end of the lamination film F is released at the open position. When the end of the lamination film F is gripped by the gripper 15a, the position of the end of the lamination film F is detected by the sheet position detection sensor S2.

The switching claw 25 is disposed downstream from the sheet position detection sensor S2 in the sheet conveyance direction. The switching claw 25 is displaced by a switching claw motor 25a (see FIG. 3) serving as a displacer to selectively occupy a first position A indicated by a solid line and a second position B indicated by a long dashed double-dotted line in FIG. 6. The switching claw 25 is movable between the first position A and the second position B by the switching claw motor 25a (see FIG. 3). When the switching claw 25 occupies the first position A, a leading end of the lamination film F conveyed between the winding roller 102 and the first conveying roller pair 104 can pass in any of the conveyance direction and the reverse conveyance direction. When the switching claw 25 occupies the second position B, the leading end of the lamination film F in the conveyance direction (i.e., the leading end located upstream from the switching claw 25 in the conveyance direction) passes through the switching claw 25 and can be conveyed downstream from the switching claw 25. When the switching claw 25 occupies the second position, the leading end of the lamination film F in the reverse conveyance direction (i.e., the leading end located downstream from the switching claw 25 in the conveyance direction) is rejected from passing through the leading end of the switching claw 25 and moving to the upstream side in the conveyance direction. At this time, the leading end of the lamination film F in the reverse conveyance direction is separated into two sheets by the separation claw 26. One of the two sheets constituting the lamination film F is guided by the switching claw 25 and conveyed to the right side in FIG. 6. The leading end of the other of the two sheets of the separated lamination film F in the reverse conveyance direction is guided by the guide plate 27 fixed to a body of the laminator 3 and conveyed to the left side in FIG. 6. In this way, the ends of the lamination film F are guided to the left and right by the switching claw 25 and the guide plate 27. Accordingly, the lamination film F is held in a state where the joined side is nipped by the first conveying roller pair 104 and the "non-joined side opposite to the joined side" is open.

A pair of separation claws 26 is disposed downstream from the switching claw 25 in the sheet conveyance direction. The pair of separation claws 26 are movable in the width direction of the lamination film F, that is, in the direction perpendicular to the plane on which FIG. 6 is illustrated. Each separation claw 26 is selectively positioned at a standby position and a separation position by a separation claw motor 26a (see FIG. 3). The separation claws 26 have pointed leading ends that are inner ends opposed to each other, and are formed so that each leading end can be inserted between overlaid sheets of the lamination film F when each separation claw 26 occupies the separation position. When each separation claw 26 occupies the standby position, the leading end of each separation claw 26 is retreated to the outside of the conveyance region of the lamination film F. Thus, the separation claws 26 do not disturb the conveyance of the lamination film F. The sheet condition detection sensor S3 is disposed at a position corresponding to the leading end of the lamination film F, into which the separation claws 26 are inserted, in the conveyance direction.

In FIGS. 1 and 2, each of the third conveying roller pair 103, the heating roller pair 119, and the ejection roller pair 120 includes a drive roller and a driven roller that are pressed against each other. The third conveying roller pair motor 103a (see FIG. 3) drives a drive roller of the third conveying roller pair 103 to rotate. A heating roller pair motor 119a (see FIG. 3) drives a drive roller of the heating roller pair 119 to rotate. An ejection roller pair motor 120a (see FIG. 3) drives a drive roller of the ejection roller pair 120 to rotate. Thus, a sheet is nipped and conveyed. The third conveying roller pair 103, the heating roller pair 119, and the ejection roller pair 120 are rotatable only in the conveyance direction. The heating roller pair 119 includes a heating roller that has a heater therein and is driven to rotate and a pressure roller that is pressed against the heating roller and is driven to rotate. The heating roller pair 119 applies heat and pressure to the lamination film F, in which the inner sheet P is inserted between the two sheets, to join the lamination film F with the inner sheet P. A storage tray 28 that stores a finished-product lamination film FA joined and finished after the insertion of the inner sheet P is disposed downstream from the ejection roller pair 120 in the sheet conveyance direction. The storage tray 28 stores the finished-product lamination film FA, which is vertically conveyed downward in the body of the laminator 3, in vertical state. The storage tray 28 has an opening portion 28a on the front face of the apparatus body so that the stored finished-product lamination film FA can be easily taken out.

Figure 3:
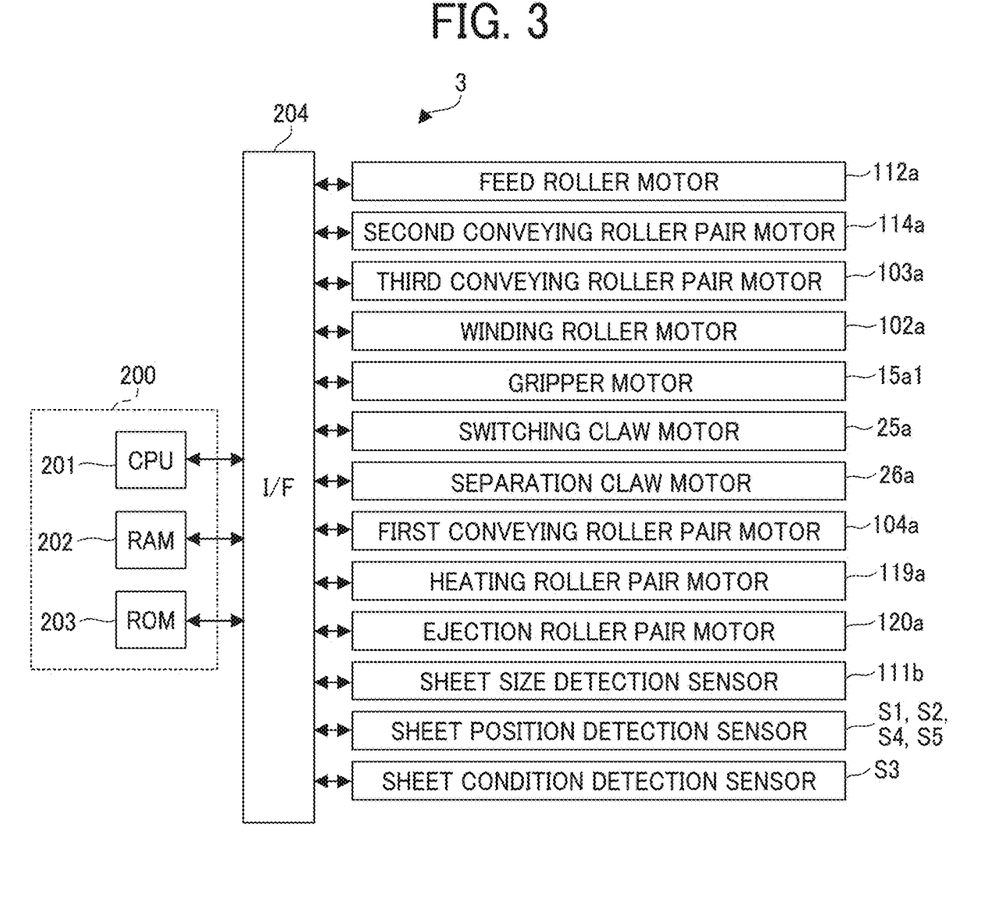
FIG. 3 is a diagram illustrating a hardware configuration of a control block that controls an operation of the laminator.

FIG. 3 is a diagram illustrating a hardware configuration for executing control processing executed in the laminator 3. As illustrated in FIG. 3, the laminator 3 includes a central processing unit (CPU) 201, a random access memory (RAM) 202, a read only memory (ROM) 203, and an interface (I/F) 204. The CPU 201, the RAM 202, the ROM 203, and the I/F 204 are connected to each other.

The CPU 201 is an arithmetic unit and controls the overall operation of the laminator 3. The RAM 202 is a volatile storage medium that allows data to be read and written at high speed. The CPU 201 uses the RAM 202 as a work area for data processing. The ROM 203 is a read-only non-volatile storage medium that stores programs such as firmware.

The laminator 3 processes, by an arithmetic function of the CPU 201, e.g., a control program stored in the ROM 203 and an information processing program (or application program) loaded into the RAM 202. Such processing configures a software controller including various functional modules of the laminator 3. The software controller thus configured cooperates with hardware resources of the laminator 3 to construct functional blocks to implement functions of the laminator 3. In other words, the CPU 201, the RAM 202, and the ROM 203 constitute a controller 200 (serving as circuitry) to control the operation of the laminator 3.

The I/F 204 is an interface that connects the sheet feed roller motor 112a, the second conveying roller pair motor 114a, the third conveying roller pair motor 103a, the winding roller motor 102a, the gripper motor 15a1, the switching claw motor 25a, the separation claw motor 26a, a first conveying roller pair motor 104a, the heating roller pair motor 119a, the ejection roller pair motor 120a, the sheet size detection sensor 111b, the sheet position detection sensors S1, S2, S4, and S5, and the sheet condition detection sensor S3 to the controller 200. The controller 200 controls, through the I/F 204, driving of the sheet feed roller motor 112a, the second conveying roller pair motor 114a, the third conveying roller pair motor 103a, the winding roller motor 102a, the gripper motor 15a1, the switching claw motor 25a, the separation claw motor 26a, the first conveying roller pair motor 104a, the heating roller pair motor 119a, and the ejection roller pair motor 120a. The controller 200 also acquires detection results from the sheet size detection sensor 111b, the sheet position detection sensors S1, S2, S4, and S5, and the sheet condition detection sensor S3.

Figure 4:
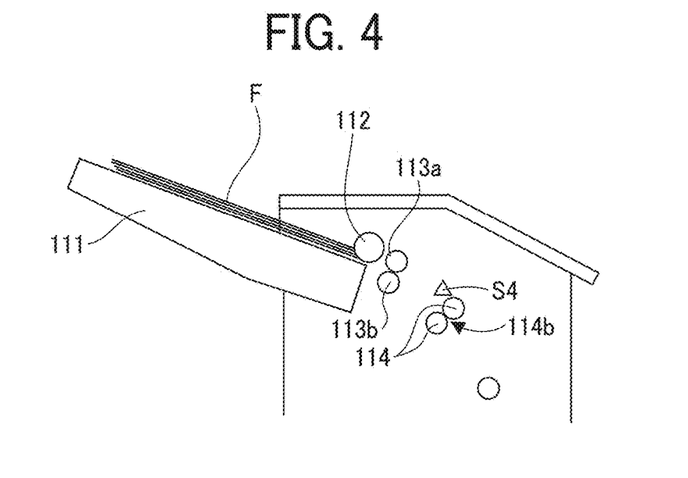
FIG. 4 is a diagram illustrating an operation of a sheet feeder of the laminator.

Next, a description is given of a series of operations performed in the laminator 3, with reference to FIGS. 7A to 7H. The series of operations performed in the laminator 3 indicates the operations of separating the lamination film F, inserting the inner sheet P into the lamination film F, and joining the lamination film F and the inner sheet P. The configurations of the winding roller 102, the switching claw 25, and the separation claw 26 described above and the operation described below are disclosed in detail in a technology by the same applicant of the present disclosure, for example, Japanese Patent Application Publication No. 2021-143072 or its corresponding U.S. Patent Application publication No. 2021-0289090, which is hereby incorporated by reference as though disclosed herein in its entirety. As illustrated in FIG. 4, the lamination film F on the sheet feed tray 111 is a pair of two sheets in which one side of four sides is joined, and is set such that one side having a joined portion where two sheets are joined is positioned downstream from the sheet feed tray 111 in the sheet conveyance direction. Thus, a plurality of lamination films F are stacked on the sheet feed tray 6. When the setting of the lamination sheet S is confirmed and a start key is turned on, the laminator 3 operates the sheet feed roller 112 and the separation roller pair 113 to feed one lamination film F toward the third conveying roller pair 103.

Figure 7A:
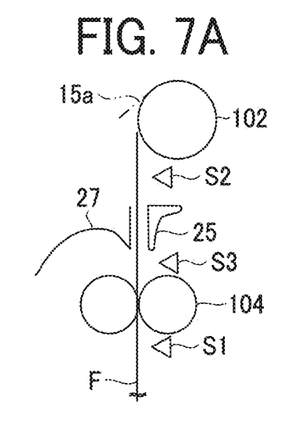
FIGS. 7A to 7H are diagrams illustrating a series of operations of a separation section according to an embodiment of the present disclosure.

The third conveying roller pair 103, which has received the lamination film F from the separation roller pair 113, conveys the lamination film F further downstream from the third conveying roller pair 103. The leading end of the conveyed lamination film F in the conveyance direction is one side having a joined portion where two sheets are joined. The trailing end in the conveyance direction is the other side having an overlaid portion where two sheets are overlaid. The laminator 3 temporarily stops the conveyance of the at the time when the trailing end of the lamination film F in the conveyance direction passes through the winding roller 102 and the detection of the lamination film F by the sheet position detection sensor S2 is lost. Thereafter, the laminator 3 operates the gripper motor 15a1 serving as an opening and closing member to displace the gripper 15a from the closed position to the open position as illustrated in FIG. 7A.

Figure 7B:
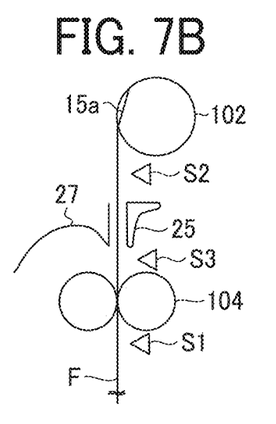

Next, the laminator 3 rotates the first conveying roller pair 104 in reverse to convey the lamination film F in reverse vertically upward. When the laminator 3 recognizes, based on a signal from the sheet position detection sensor S2, that the trailing end (i.e., the leading end in the reverse conveyance direction) of the lamination film F conveyed in reverse has been conveyed to a position where the trailing end can be gripped by the gripper 15a occupying the open position, the reverse conveyance of the lamination film F is stopped. Thereafter, the laminator 3 operates the gripper motor 15a1 (see FIG. 3) to displace the gripper 15a from the open position to the closed position as illustrated in FIG. 7B. Thus, the laminator 3 holds the lamination film F on the outer circumferential surface of the winding roller 102.

Figure 7C:
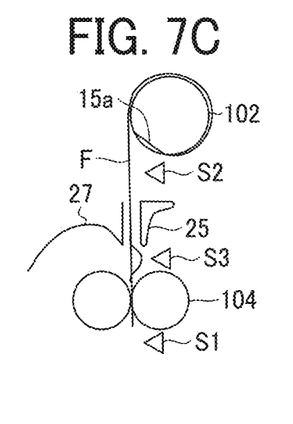

Next, the laminator 3 drives to rotate the winding roller 102 in a clockwise direction in FIG. 6 and winds the lamination film F on an outer circumferential surface of the winding roller 102. When the lamination film F is wound around the outer circumferential surface of the winding roller 102 by about one turn, the sheet positioned on the inner side of the lamination film F is left over against the sheet positioned on the outer side of the lamination film F due to a difference in circumferential length when the two overlaid sheets are wound. Thus, a slack is generated in the joined portion that is one side of the lamination film F. As a result, a space is generated between the sheets as illustrated in FIG. 7C. The generated space is detected by the sheet condition detection sensor S3. The controller 200 controls the conveyance of the lamination film F in a case where the lamination film F is wound around the winding roller 102 based on the signal from the sheet position detection sensors S1 and S2. In a state illustrated in FIG. 7C, the one side of the lamination film F on which the joined portion is disposed is placed downstream from the sheet position detection sensor S2 in the reverse conveyance direction.

Figure 7D:
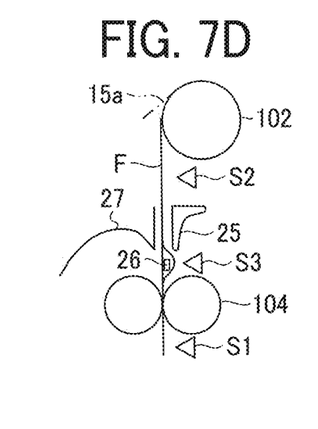
Figure 7E:
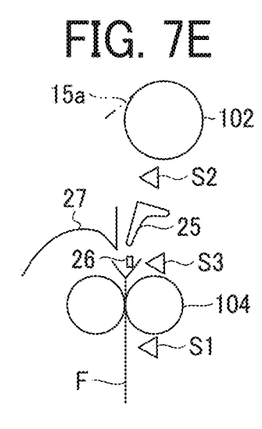
Figure 7F:
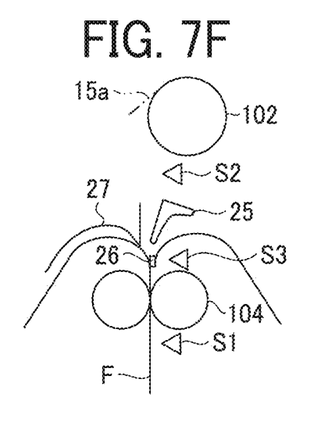
Figure 7G:
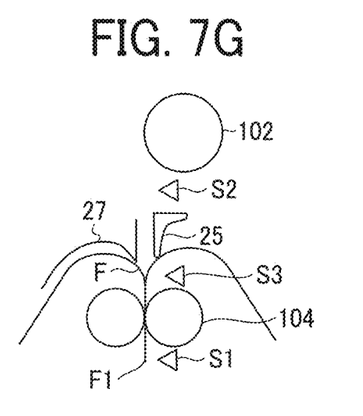
Figure 7H:
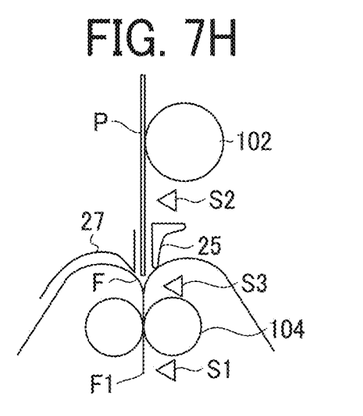

Next, the laminator 3 activates the separation claw motor 26a (see FIG. 3) serving as a mover to move the separation claws 26 from the standby position to the separation position. At this time, the laminator 3 inserts the separation claws 26 into the space generated between the sheets from both sides in the width direction of the lamination film F and reliably maintains the generated space by the separation claws 26 as illustrated in FIG. 7D. Thereafter, the winding roller 102 is rotated in the counterclockwise direction in FIG. 6 in a state where the separation claws 26 are inserted between the sheets. The first conveying roller pair 104 is rotated in the normal direction to move the space in which the sheets are separated to the trailing end of the lamination film F in the conveyance direction. In the middle of the operation, when the lamination film F is moved by a specified amount, the gripper 15a is displaced to the open position to release the trailing end in the conveyance direction of the lamination film F held by the winding roller 102. Thereafter, when the trailing end of the lamination film F in the conveyance direction has reached the position corresponding to the separation claws 26, the conveyance of the lamination film F is stopped and the switching claw motor 25a (see FIG. 3) is operated. Thus, the switching claw 25 is displaced from the first position A to the second position B as illustrated in FIG. 7E.

Next, the laminator 3 rotates the first conveying roller pair 104 in reverse to convey the lamination film F in reverse. At this time, one of the two sheets separated from each other by the separation claws 26, which is placed on the right side in FIG. 6, is guided rightward by the switching claw 25 located at the second position. The other sheet of the two sheets placed on the left side in FIG. 6 is guided leftward by the guide plate 27. During this operation, when the two separated sheets are guided in the left and right directions by the switching claw 25 and the guide plate 27, respectively, the separation claw motor 26a (see FIG. 3) is operated to move the separation claws 26 from the separation position to the standby position. Thus, the sheets are brought to the state illustrated in FIG. 7F. When the lamination film F is further conveyed in the reverse direction, the two separated sheets are entirely separated from each other. When one side F1 of the lamination film F has reached a specified position, the reverse conveyance of the lamination film F is temporarily stopped. At this time, the joined portion of the lamination film F is nipped by the first conveying roller pair 104, and the overlaid portion is largely opened to the left and right. Thereafter, the switching claw motor 25a (see FIG. 3) is operated to displace the switching claw 25 from the second position B to the first position A. Thus, the sheets are brought to the state illustrated in FIG. 7G.

Next, the inner sheet P is fed from the image forming apparatus 2 via the relay device 2C. The fed inner sheet P is taken into the inside of the body of the laminator 3 via the entrance roller pair 116, is detected by the sheet position detection sensor S5, and is guided by the turn guide plate 121 to be delivered to the third conveying roller pair 103. Thereafter, the inner sheet P is further conveyed downward by the third conveying roller pair 103, and the leading end of the inner sheet P is inserted into the overlaid portion (the opposite side of the joined portion) of the lamination film F that is widely opened to the left and right. Thus, the sheets are brought to the state illustrated in FIG. 7H. Next, the laminator 3 conveys the lamination film F vertically downward into which the inner sheet P is inserted. The sheets are overlaid again to close the opening. The lamination film F into which the inner sheet P is inserted is further conveyed downward by a plurality of the conveying roller pairs. Thus, the lamination film F is sent to the heating roller pair 119.

The inner sheet P and the lamination film F sent to the heating roller pair 119 are cooled when passing through the and the ejection roller pair 120 after the lamination film F and the inner sheet P are joined by the action of heat and pressure. The finished-product lamination film FA that has been cooled and completed is ejected to the storage tray 28 in an upright state by the ejection roller pair 120. As described above, since the finished-product lamination film FA pressed after passing through the heating roller pair 119 is ejected vertically downward, the finished product lamination film FA can be stored in the storage tray 28 while being prevented from being curved by an external force. In this configuration, since the finished-product lamination film FA is ejected vertically downward, gravity and external force that would deform the finished-product lamination film FA do not act on the finished-product lamination sheet SA. Since the finished-product lamination film FA is sufficiently cooled by arrival at the storage tray 28, the finished-product lamination film FA is prevented from deforming even if the stacking surface of the storage tray 28 is inclined.

In a case of an image forming operation in which the laminate processing is not performed, a transfer sheet PA that is ejected from the image forming apparatus 2 and is not used as the inner sheet P is received by the entrance roller pair 116 of the laminator 3. Thereafter, the transfer sheet PA is conveyed in the horizontal direction and is ejected from an ejection port of the laminator 3 by the ejection roller pair 118. At this time, in a case where the post-processing apparatus 4 is coupled downstream from the laminator 3, post processing such as staple processing and sort processing can be performed on the transfer sheet PA in the post-processing apparatus 4. The transfer sheets PA is stacked on an output tray of the post-processing apparatus 4. In the present embodiment, only an image forming system including the laminator 3 is described, and a description of a detailed operation of the post-processing apparatus 4, processing of the transfer sheet PA, and the like, are omitted.

In the image forming system 1 including the above-described laminator 3, the post-processing apparatus 4, and the like, a series of the laminate processing operations including feeding of the lamination film F, separation of the lamination film F, insertion of the inner sheet P into the lamination film F, and joining of the lamination film F and the inner sheet P by heating and pressing can be automatically performed. Thus, convenience can be improved as compared with the configuration of the related art.

In the operation of the laminator 3 as described above, when the lamination film F and the inner sheet P are conveyed to the respective rollers, the lamination film F and the inner sheet P may not correctly go straight toward the rollers and enter the rollers obliquely. Consequently, the inner sheet P may not be inserted into the lamination film F at a properly targeted position or a part of the inner sheet P may protrude from the lamination film F. To avoid this failure, performing skew correction, so-called skew correction processing, is known in such a conveyance processing system. However, since friction resistance and rigidity of the surface of a lamination film in particular are lower than those of paper, skewing may get worse in some cases such as when the film is set in a condition of being stacked on the sheet feed tray 111 and when the lamination film passes the turn guide plate 121 having a large curvature. Accordingly, a method for fixing the relative position of the lamination film F and the inner sheet P has been accurately required.

Figure 10:
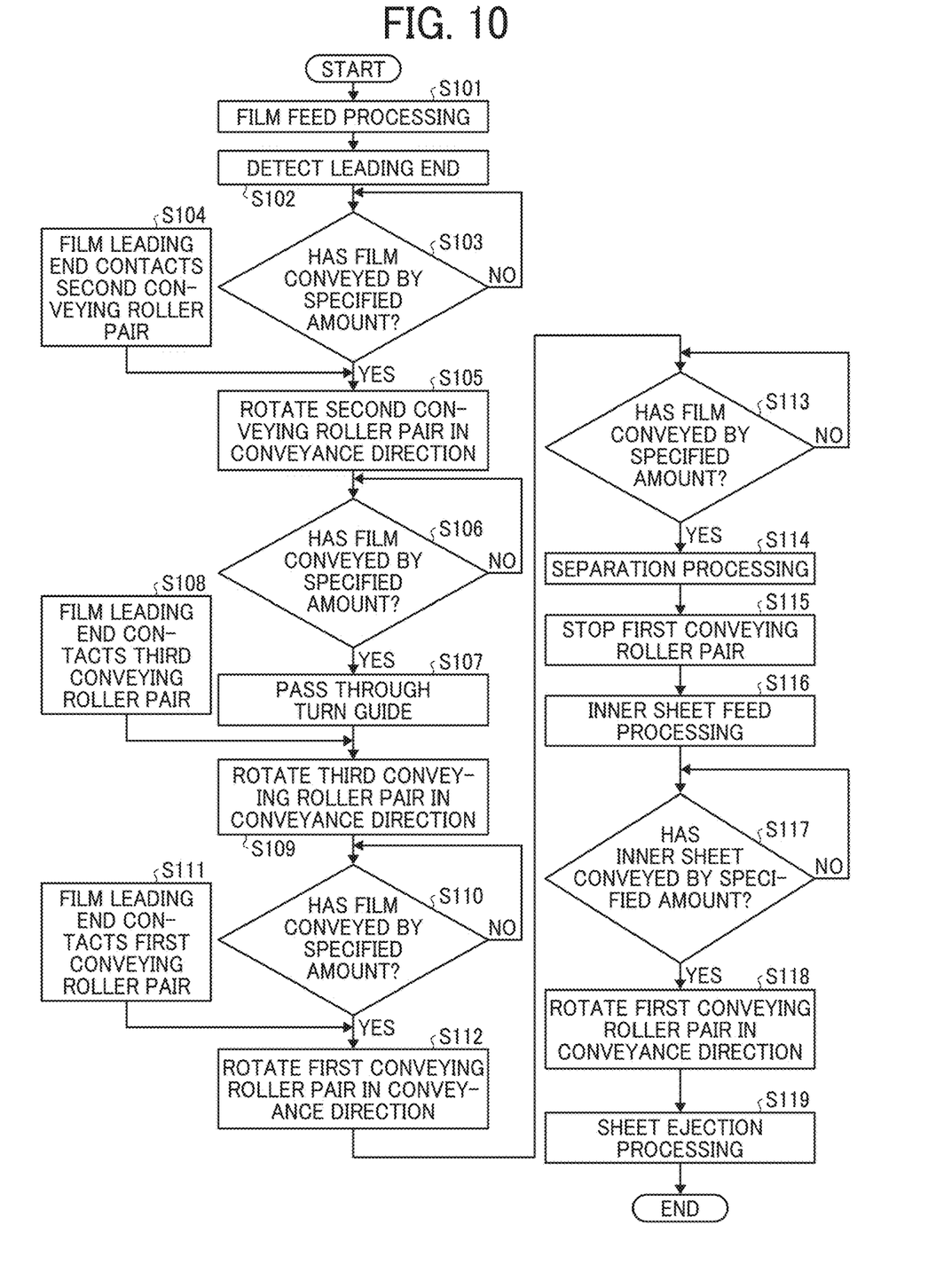
FIG. 10 is a diagram illustrating an operation of the laminator.

A description is given of the skew correction, so-called skew correction processing, according to an embodiment of the present disclosure with reference to FIGS. 4 and 10. As described above, when the setting of the lamination film F is confirmed and a start key is turned on, the laminator 3 operates the sheet feed roller 112 and the separation roller pair 113 to feed one lamination film F toward the third conveying roller pair 103 (in step S101 of FIG. 10).

When the sheet position detection sensor S4 detects the leading end of the lamination film F (in step S102 of FIG. 10), the laminator 3 determines whether the lamination film F has been conveyed by a specified amount (in step S103 of FIG. 10). The specified amount in such a step S103 varies according to the design of the apparatus and the distance from the sheet position detection sensor S4 to the second conveying roller pair 114. It is preferable that the above-described distance is basically the distance from when the leading end of the lamination film F in the conveyance direction is detected by the sheet position detection sensor S4 to when the leading end of the lamination film F in the conveyance direction contacts the second conveying roller pair 114 (in step S104 of FIG. 10). As in step S104, the rotation is stopped until the lamination film F contacts the second conveying roller pair 114 such that the leading end of the lamination film F in the conveyance direction contacts the second conveying roller pair 114. With such a configuration, the laminator 3 of the present embodiment performs first skew correction processing. When the sheet position detection sensor S4 confirms that the lamination film F has reached, the laminator 3 does not rotate the second conveying roller pair 114. Accordingly, the lamination film F contacts the second conveying roller pair 114. In a case where the lamination film F is skewed by a feeding force of the separation roller pair 113, the skew is corrected. Such correction is performed at the second conveying roller pair 114, that is, on the upstream side in the conveyance direction from the turn guide plate 121 at which the lamination film placed on the sheet feed tray 111, is conveyed one by one by the sheet feed roller 112 and the separation roller pair 113 and arrives. As is clear from FIG. 6, such a conveyance passage is located upper than the conveyance passage of the inner sheet P conveyed from the image forming apparatus 2. The skew correction processing by the second conveying roller pair 114 is performed only on the lamination film F. The lamination film F is contacted against the second conveying roller pair 114 so that the first skew correction processing is performed. Thus, the laminator 3 can reduce a difference due to variations in film setting that occurs when a user stacks the lamination films F on the sheet feed tray 111. After the skew correction is performed, the laminator 3 rotates the second conveying roller pair 114 as usual to transfer the lamination film F downstream from the second conveying roller pair 114 in the conveyance direction (in step S105 of FIG. 10).

When the lamination film F is further conveyed by a specified amount from the step S105 (in step S106 of FIG.

10), the lamination film F passes through the turn guide plate 121. When the lamination film F is conveyed to the third conveying roller pair 103 through the turn guide plate 121 (in step S107 of FIG. 10) after the lamination film F has passed through the second conveying roller pair 114, the leading end of the lamination film F is contacted against the third conveying roller pair 103 so that second skew correction processing is performed as already illustrated in FIG. 5. The purpose of the second skew correction processing is to correct skew variation generated due to the lamination film F passing through the turn guide plate 121 having a large curvature.

In the skew correction processing in the third conveying roller pair 103 as well, whether the leading end of the lamination film F has contacted the third conveying roller pair 103 may be detected (in step S108 of FIG. 10). The lamination film F contacts the third conveying roller pair 103 so that the skew is corrected when the lamination film F is skewed. As described above, the third conveying roller pair 103 is rotated in the conveyance direction as usual (in step S109 of FIG. 10) after contacting of the lamination film F against the third conveying roller pair 103 is confirmed.

Further, on the downstream side in the conveyance direction, the lamination film F is conveyed downstream from the third conveying roller pair 103 and is contacted against the first conveying roller pair 104 so that third skew correction processing is performed (in step S111 of FIG. 10). As described above, the lamination film F is contacted against the first conveying roller pair 104 so that the skew correction processing is performed. Thus, variations of the skew immediately before the separation processing can be minimized.

As described with FIG. 6, after the skew correction processing is performed in the first conveying roller pair 104, the leading end of the lamination film F in the conveyance direction passes through the nip portion by the first conveying roller pair 104 (in step S112 of FIG. 10), and a series of separation processing operations as in FIGS. 7A to 7H is performed so that the lamination film F is in a state of waiting for the insertion of the inner sheet P (in steps S113, S114, and S115 of FIG. 10). The state of waiting for the insertion is a state where a film joined portion 122 that is one side of the joined lamination film F is held in a nip portion 104b of the first conveying roller pair 104. Note that, for adjustment of the insertion position, the film joined portion 122 may be held at any position downstream from the nip portion 104b in the conveyance direction.

Next, a sheet feed processing operation is performed on the inner sheet P conveyed from the image forming apparatus 2 (in step S116 of FIG. 10). When the position of the inner sheet P is detected by the sheet position detection sensor S5, the inner sheet P is conveyed by a specified amount (in step S117 of FIG. 10) after the inner sheet P has passed through the entrance roller pair 116 and the turn guide plate 121. Note that the inner sheet P is also contacted against the third conveying roller pair 103 via the turn guide plate 121 to perform the skew correction.

Figure 8:
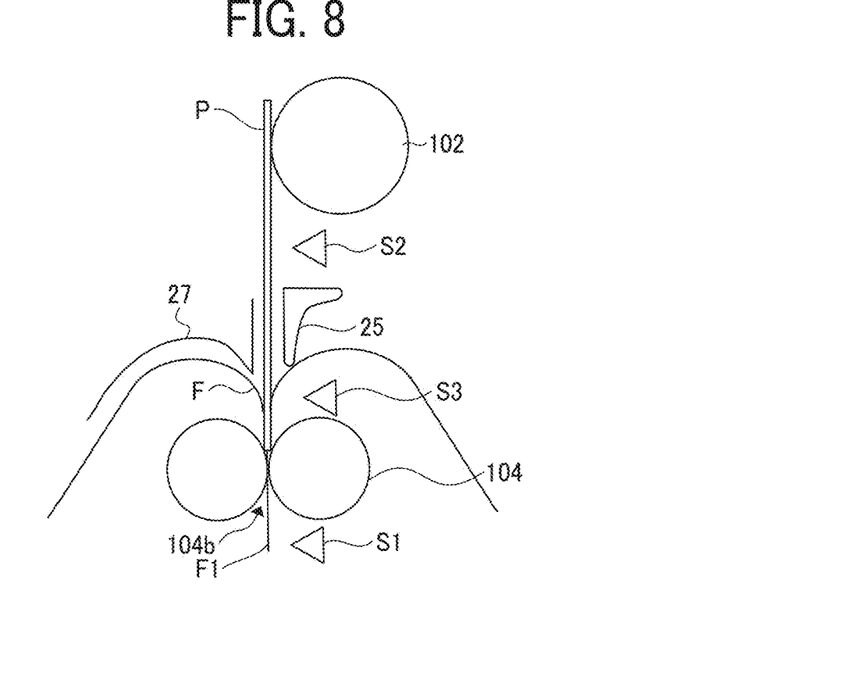
FIG. 8 is a diagram illustrating an operation of skew correction in the first conveying roller pair.

When the sheet position detection sensor S2 also detects that the inner sheet P has reached, the laminator 3 keeps the first conveying roller pair 104 without rotation. Thus, the inner sheet P contacts the film joined portion of the lamination film F as illustrated in FIG. 8 and the skew correction processing is also performed in the first conveying roller pair 104. As described, when the lamination film F is held by the first conveying roller pair 104 in a separated state, the inner sheet P is inserted into the lamination film F from the trailing end and the skew correction processing is performed at the same time. Thus, the inner sheet P is inserted into the lamination film F in a state where a shift of the skew, that is, a variation in the relative positions between the inner sheet P and the lamination film F is small.

Figure 9:
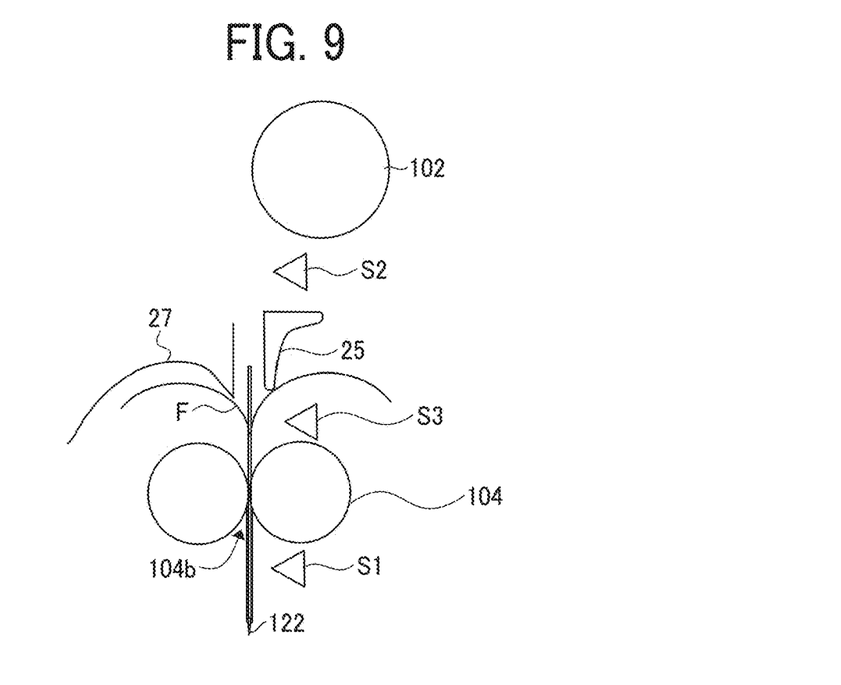
FIG. 9 is a diagram illustrating a conveyance operation of an inner sheet laminated by the first conveying roller pair.

As described above, when the inner sheet P is inserted straight into the lamination film F, the first conveying roller pair 104 rotates forward to convey the lamination film F and the inner sheet P toward the downstream side in the conveyance direction (in step S118 of FIG. 10). At this time, as illustrated in FIG. 9, when the first conveying roller pair 104 feeds the lamination film F downward, the ends of the two separated sheets are sequentially closed with the inner sheet P sandwiched therebetween. Thus, the two sheets constituting the lamination film F are closed and bonded together by pressure and heat applied by the heating roller pair 119. The ejection roller pair 120 ejects the closed finished-product lamination film FA to the storage tray 28 (in step S119 of FIG. 10).

The laminator 3 according to the present embodiment can convey the lamination film F, which is formed by joining one of four sides of the two overlaid sheets, in a state where the joined side is located on the downstream side in the conveyance direction. The laminator 3 separates the lamination film F into two sheets at an end opposite to the joined side and inserts the inner sheet P from a non-joined side opposite the joined side so that the inner sheet P can be sandwiched between the two overlaid sheets. The laminator 3 includes the first conveying roller pair 104 having a pair of rollers that conveys the lamination film F. The first conveying roller pair 104 holds the joined portion of the two overlaid lamination films F at the nip portion 104b formed by the first conveying roller pair 104 when the inner sheet P is inserted, and contacts the inner sheet P to the film joined portion 122 to perform the skew correction. With such a configuration, the inner sheet P is inserted into the lamination film F in a state where the skewing is restricted.

In the present embodiment, the first conveying roller pair 104 holds the film joined portion 122 of the single overlaid lamination film F at any position downstream from the nip portion 104b and contacts at least one inner sheet P coming from the upstream side in the conveyance direction against the nip portion 104b to perform the skew correction. With such a configuration, the inner sheet P is inserted into the lamination film F in a state where the skewing is restricted.

In the present embodiment, the skew correction is performed on the lamination film F twice by each of the second conveying roller pair 114 and the third conveying roller pair 103 before the lamination film F has reached the nip portion 104b. Further, the lamination film F is contacted against the first conveying roller pair 104 so that the skew correction is performed. With such a configuration, the skew variation of the lamination film F can be minimized during the separation processing by performing the skew correction of multiple times. Thus, the laminate processing can be performed in a state where the skewing is restricted.

In the present embodiment, a sheet separation device includes the sheet feed tray 111 to supply the lamination film F and the second conveying roller pair 114 to convey the lamination film F fed from the sheet feed tray 111. The leading end of the lamination film F is contacted against a nip portion 114b formed by the second conveying roller pair 114 to perform the skew correction. According to such a configuration, a setting variation in the sheet feed tray 111 on which the lamination film F is placed can be eliminated by skew correction performed in the second conveying roller pair 114. Thus, the lamination processing can be performed in a state where the skewing is further restricted.

In the present embodiment, the sheet separation device includes the turn guide plate 121 to guide the lamination film F to the downstream side in the conveyance direction and the third conveying roller pair 103 to convey the lamination film F after passing through the turn guide plate 121. The leading end of the lamination film F is contacted against a nip portion 103*b* formed by the third conveying roller pair 103 to perform the skew correction. With such a configuration, the skew of the lamination film F that may occur in the turn guide plate 121 having a large curvature can be reduced by correction. Thus, lamination processing can be performed in a state in which the skewing is restricted.

In the present embodiment, the controller 200 controls the operation of any one of the first conveying roller pair 104, the second conveying roller pair 114, and the third conveying roller pair 103 to adjust the timing of stop or conveyance so that the lamination film F is placed at a target relative position when the leading end of the lamination film F contacts against the nip portion formed by any one of the first conveying roller pair 104, the second conveying roller pair 114, and the third conveying roller pair 103 for the skew correction. With such a configuration, the position adjustment of the lamination film F is performed and the skew correction is performed, thus allowing the lamination processing in a state where the skewing is restricted.

The effects appropriately described in the above-described embodiments and examples of the present disclosure are merely listing examples of the effects obtained from embodiments of the present disclosure, and the effects according to the present disclosure are not limited to those described in the embodiments and examples of the present disclosure.

Aspects of the present disclosure are, for example, as follows.

First Aspect

In a first aspect, a sheet separation device conveys a two-ply sheet (e.g., the lamination film F), in which two sheets are overlaid with each other and joined at one side of four sides of the two-ply sheet, in a state where the one side joined is located on an upstream side or a downstream side of the two-ply sheet (e.g., the lamination film F) in a sheet conveyance direction, separates the two-ply sheet (e.g., the lamination film F) into the two sheets at an end opposite the one side joined, and inserts an inner sheet (e.g., the inner sheet P) from a non-joined side opposite the joined side in the sheet conveyance direction so that the inner sheet (e.g., the inner sheet P) is sandwiched between the two sheets overlaid with each other. The sheet separation device includes a conveying roller pair (e.g., the first conveying roller pair 104) having a pair of rollers that conveys the two-ply sheet (e.g., the lamination film F). The conveying roller pair (e.g., the first conveying roller pair 104) holds a joined portion (e.g., the joined portion 122) of in the two-ply sheet (e.g., the lamination film F) at which the two sheets are joined, at a nip portion (e.g., the nip portion 104*b*) of the conveying roller pair (e.g., the first conveying roller pair 104) when the inner sheet (e.g., the inner sheet P) is inserted into the two-ply sheet (e.g., the lamination film F), and contacts the inner sheet (e.g., the inner sheet P) against the joined portion (e.g., the joined portion 122) of the two-ply sheet (e.g., the lamination film F) to perform skew correction. With such a configuration, the inner sheet (e.g., the inner sheet P) is inserted into the two-ply sheet (e.g., the lamination film F) in a state where skewing is restricted.

Second Aspect

In a second aspect, in the sheet separation device according to the first aspect, the conveying roller pair (e.g., the first conveying roller pair 104) holds the joined portion (e.g., the joined portion 122) of the two-ply sheet (e.g., the lamination film F) at a position downstream from the nip portion (e.g., the nip portion 104*b*) in the sheet conveyance direction. The conveying roller pair (e.g., the first conveying roller pair 104) contacts at least one inner sheet (e.g., the inner sheet P) coming from an upstream side in the conveyance direction against the nip portion (e.g., the nip portion 104*b*) to perform the skew correction. With such a configuration, the inner sheet (e.g., the inner sheet P) is inserted into the two-ply sheet (e.g., the lamination film F) in a state where skewing is restricted.

Third Aspect

In a third aspect, the sheet separation device according to the first or second aspect performs multiple times of skew correction before the two-ply sheet (e.g., the lamination film F) arrives at the nip portion (e.g., the nip portion 104*b*) and contacts the two-ply sheet (e.g., the lamination film F) against at least the conveying roller pair (e.g., the first conveying roller pair 104) to perform skew correction. With such a configuration, the skew variation of the two-ply sheet (e.g., the lamination film F) can be minimized during the separation processing by performing multiple times of skew correction. Thus, the laminate processing can be performed in a state where skewing is restricted.

Fourth Aspect

In a fourth aspect, the sheet separation device according to any one of the first to third aspects further includes a sheet feeder (e.g., the sheet feed tray 111) and another conveying roller pair (e.g., the second conveying roller pair 114). The sheet feeder (e.g., the sheet feed tray 111) supplies the two-ply sheet (e.g., the lamination film F). The conveying roller pair (e.g., the second conveying roller pair 114) conveys the two-ply sheet (e.g., the lamination film F) fed from the sheet feeder (e.g., the sheet feed tray 111) and contacts a leading end of the two-ply sheet (e.g., the lamination film F) against a nip portion (e.g., the nip portion 114*b*) of the conveying roller pair (e.g., the second conveying roller pair 114) to perform skew correction. According to such a configuration, a setting variation in the sheet feeder (e.g., the sheet feed tray 111) on which the two-ply sheet (e.g., the lamination film F) is placed can be eliminated by skew correction performed in the conveying roller pair (e.g., the second conveying roller pair 114). Thus, the lamination processing can be performed in a state where skewing is further restricted.

Fifth Aspect

In a fifth aspect, the sheet separation device according to any one of the first to fourth aspects further includes a turn guide plate (e.g., the turn guide plate 121) and another conveying roller pair (e.g., the third conveying roller pair 103). The turn guide plate (e.g., the turn guide plate 121) guides the two-ply sheet (e.g., the lamination film F) toward a separator. The conveying roller pair (e.g., the third conveying roller pair 103) conveys the two-ply sheet (e.g., the lamination film F) after the two-ply sheet (e.g., the lamination film F) has passed through the turn guide plate (e.g., the turn guide plate 121). The conveying roller pair (e.g., the third conveying roller pair 103) contacts a leading end of the two-ply sheet (e.g., the lamination film F) against a nip portion (e.g., the nip portion 103b) of the conveying roller pair (e.g., the third conveying roller pair 103) to perform skew correction. With such a configuration, the skew of the two-ply sheet (e.g., the lamination film F) that may occur in the turn guide plate (e.g., the turn guide plate 121) having a large curvature can be reduced by correction. Thus, lamination processing can be performed in a state in which skewing is restricted.

Sixth Aspect

In a sixth aspect, the sheet separation device according to any one of the first to fifth aspects further includes a plurality of conveying roller pairs (e.g., the first conveying roller pair 104, the second conveying roller pair 114, and the third conveying roller pair 103) including the conveyance roller pair (e.g., the first conveying roller pair 104). The sheet separation device controls an operation of any one of the plurality of conveying roller pairs (e.g., the first conveying roller pair 104, the second conveying roller pair 114, and the third conveying roller pair 103) to adjust timing of stop or conveyance so that the two-ply sheet (e.g., the lamination film F) is placed at a target relative position when a leading end of the two-ply sheet (e.g., the lamination film F) contacts against a nip portion (e.g., the nip portion 104b, the nip portion 114b, or the nip portion 103b) of any one of the plurality of conveying roller pairs (e.g., the first conveying roller pair 104, the second conveying roller pair 114, and the third conveying roller pair 103) for skew correction. With such a configuration, the position adjustment of the two-ply sheet (e.g., the lamination film F) is performed and the skew correction is performed, thus allowing the lamination processing in a state where skewing is restricted.

Seventh Aspect

In a seventh aspect, a laminator (e.g., the laminator 3) includes the sheet separation device according to any one of the first to sixth aspects. With such a configuration, the inner sheet (e.g., the inner sheet P) is inserted into the two-ply sheet (e.g., the lamination film F) in a state where skewing is restricted.

Eighth Aspect

In an eighth aspect, an image forming apparatus (e.g., the image forming apparatus 2) in an eighth aspect includes the sheet separation device according to any one of the first to sixth aspects. According to such a configuration, since the image forming apparatus (e.g., the image forming apparatus 2) has a function as a sheet separation device, the inner sheet (e.g., the inner sheet P) is inserted into the two-ply sheet (e.g., the lamination film F) in a state where skewing is restricted.

Nineth Aspect

In a ninth aspect, an image forming apparatus (e.g., the image forming apparatus 2) in a nineth aspect includes the laminator (e.g., the laminator 3) according to the seventh aspect. According to such a configuration, since the image forming apparatus (e.g., the image forming apparatus 2) includes the laminator (e.g., the laminator 3), the inner sheet (e.g., the inner sheet P) is inserted into the two-ply sheet (e.g., the lamination film F) in a state where skewing is restricted.

Tenth Aspect

In a tenth aspect, an image forming system (e.g., the image forming system 1) includes the sheet separation device according to any one of the first to sixth aspects and an image forming apparatus (e.g., the image forming apparatus 2) that includes an image forming device (e.g., the image forming device 2A) to form an image on an inner sheet (e.g., the inner sheet P). According to such a configuration, since the image forming system (e.g., the image forming system 1) has a function as a sheet separation device, the inner sheet (e.g., the inner sheet P) is inserted into the two-ply sheet (e.g., the lamination film F) in a state where skewing is restricted.

Eleventh Aspect

In an eleventh aspect, an image forming system (e.g., the image forming system 1) includes the laminator (e.g., the laminator 3) according to the seventh aspect and an image forming apparatus (e.g., the image forming apparatus 2) that includes an image forming device (e.g., the image forming device 2A) to form an image on an inner sheet (e.g., the inner sheet P). With such a configuration, since the image forming system (e.g., the image forming system 1) includes the laminator (e.g., the laminator 3) and the image forming apparatus (e.g., the image forming apparatus 2), the inner sheet (e.g., the inner sheet P) is inserted into the two-ply sheet (e.g., the lamination film F) in a state where skewing is restricted.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A sheet separation device configured to convey a two-ply sheet, in which two sheets are overlaid with each other and joined at one side of four sides of the two-ply sheet, in a state where the one side joined is located on an upstream side or a downstream side of the two-ply sheet in a sheet conveyance direction, separate the two-ply sheet into the two sheets at an end opposite the one side joined, and insert an inner sheet from a non-joined side opposite the joined side in the sheet conveyance direction so that the inner sheet is sandwiched between the two sheets overlaid with each other, the sheet separation device comprising:

a conveying roller pair including a pair of rollers, the conveying roller pair configured to:

convey the two-ply sheet; and hold a joined portion of in the two-ply sheet at which the two sheets are joined, at a nip portion of the conveying roller pair when the inner sheet is inserted into the two-ply sheet; and circuitry configured to contact the inner sheet against the joined portion of the two-ply sheet to perform skew correction.

2. The sheet separation device according to claim 1, wherein the conveying roller pair is configured to hold the joined portion of the two-ply sheet at a position downstream from the nip portion in the sheet conveyance direction, and wherein the circuitry is configured to control the conveying roller pair to contact at least one inner sheet coming from an upstream side in the conveyance direction against the nip portion to perform skew correction.

3. The sheet separation device according to claim 1, wherein the circuitry is configured to perform multiple times of skew correction before the two-ply sheet arrives at the nip portion, and wherein the circuitry is configured to contact the two-ply sheet against at least the conveying roller pair to perform skew correction.

4. The sheet separation device according to claim 1, further comprising:

a sheet feeder configured to supply the two-ply sheet; and another conveying roller pair configured to convey the two-ply sheet fed from the sheet feeder, wherein the circuitry is configured to contact a leading end of the two-ply sheet against a nip portion of said another conveying roller pair to perform skew correction.

5. The sheet separation device according to claim 1, further comprising:

a turn guide plate configured to guide the two-ply sheet toward a separator; and another conveying roller pair configured to convey the two-ply sheet after the two-ply sheet has passed through the turn guide plate, wherein the circuitry is configured to contact a leading end of the two-ply sheet against a nip portion of said another conveying roller pair to perform skew correction.

6. The sheet separation device according to claim 1, further comprising a plurality of conveying roller pairs including the conveyance roller pair, wherein the circuitry is configured to control an operation of any one of the plurality of conveying roller pairs to adjust timing of stop or conveyance so that the two-ply sheet is placed at a target relative position when a leading end of the two-ply sheet contacts against a nip portion of any one of the plurality of conveying roller pairs for skew correction.

7. A laminator comprising the sheet separation device according to claim 1.

8. An image forming apparatus comprising the sheet separation device according to claim 1.

9. An image forming apparatus comprising the laminator according to claim 7.

10. An image forming system comprising:

the sheet separation device according to claim 1; and an image forming apparatus including an image forming device to form an image onto the inner sheet.

11. An image forming system comprising:

the laminator according to claim 7; and an image forming apparatus to form an image onto the inner sheet.

* * * * *